United States Patent
Gorinevsky

(10) Patent No.: US 7,072,797 B2
(45) Date of Patent: Jul. 4, 2006

(54) TRENDING SYSTEM AND METHOD USING MONOTONIC REGRESSION

(75) Inventor: Dimitry Gorinevsky, Palo Alto, CA (US)

(73) Assignee: Honeywell International, Inc., Morristown, NJ (US)

(*) Notice: Subject to any disclaimer, the term of this patent is extended or adjusted under 35 U.S.C. 154(b) by 69 days.

(21) Appl. No.: 10/651,550

(22) Filed: Aug. 29, 2003

(65) Prior Publication Data

US 2005/0049832 A1 Mar. 3, 2005

(51) Int. Cl.
*G06F 11/30* (2006.01)
*G06F 15/00* (2006.01)

(52) U.S. Cl. .................................. 702/182
(58) Field of Classification Search ............. 702/182, 702/33–35, 108, 113, 127, 179, 181; 701/1, 701/3, 29, 99, 100
See application file for complete search history.

(56) References Cited

U.S. PATENT DOCUMENTS

| | | | |
|---|---|---|---|
| 4,215,412 A * | 7/1980 | Bernier et al. ............. 701/100 |
| 5,105,372 A | 4/1992 | Provost et al. | |
| 5,326,975 A * | 7/1994 | Barna .................. 250/372 |
| 5,680,310 A | 10/1997 | Morgan et al. | |
| 5,950,147 A | 9/1999 | Sarangapani et al. | |
| 5,991,707 A | 11/1999 | Searles et al. | |
| 6,014,598 A | 1/2000 | Duyar et al. | |
| 6,298,718 B1 | 10/2001 | Wang | |
| 6,343,251 B1 | 1/2002 | Herron et al. | |
| 6,466,858 B1 * | 10/2002 | Adibhatla et al. ......... 701/100 |
| 6,470,258 B1 | 10/2002 | Leamy et al. | |
| 6,532,412 B1 * | 3/2003 | Adibhatla et al. ......... 701/100 |
| 6,532,433 B1 | 3/2003 | Bharadwaj et al. | |
| 6,539,783 B1 | 4/2003 | Adibhatla | |
| 6,651,012 B1 | 11/2003 | Bechhoefer | |
| 6,687,596 B1 * | 2/2004 | Humerickhouse et al. .. 701/100 |
| 2003/0074159 A1 * | 4/2003 | Bechhoefer et al. ........ 702/181 |

OTHER PUBLICATIONS de la Vega et al., Efficient Computation of Locally Monotonic Regression, Sep. 1996, Signal Processing Letters, IEEE, vol. 3, Issue:9, pp. 263-265.*

* cited by examiner

*Primary Examiner*—Bryan Bui
*Assistant Examiner*—Demetrius Pretlow
(74) *Attorney, Agent, or Firm*—Ingrassia Fisher & Lorenz

(57) ABSTRACT

A system and method is provided for trending performance in a mechanical system. The trending system includes a performance estimator and a predictive trending mechanism. The performance estimator receives sensor data from the mechanical system and generates performance parameter estimates for the mechanical system. The performance parameter estimates are parametric data that are indicative of performance in the mechanical system. The performance parameter estimates are passed to a predictive trending mechanism. The predictive trending mechanism determines an estimated trend for the performance parameter estimates through monotonic regression of the performance parameter estimates. The estimated trend of the performance parameter estimates can include filtered values of the performance parameter estimates and/or predictions of future performance parameters.

34 Claims, 13 Drawing Sheets

TRENDING SYSTEM AND METHOD USING MONOTONIC REGRESSION

FIELD OF THE INVENTION

This invention generally relates to diagnostic systems, and more specifically relates to trending systems for mechanical systems.

BACKGROUND OF THE INVENTION

Modern mechanical systems can be exceedingly complex. The complexities of modern mechanical systems have led to increasing needs for automated prognosis and fault detection systems. These prognosis and fault detection systems are designed to monitor the mechanical system in an effort to predict the future performance of the system and detect potential faults. These systems are designed to detect these potential faults such that the potential faults can be addressed before the potential faults lead to failure in the mechanical system.

One type of mechanical system where prognosis and fault detection is of particular importance is aircraft systems. In aircraft systems, prognosis and fault detection can detect potential faults such that they can be addressed before they result in serious system failure and possible in-flight shutdowns, take-off aborts, delays or cancellations.

Current prognosis and fault detection systems have relied upon data trending of data from the mechanical system to predict future performance and detect likely faults. In general data trending involves filtering the data to generate a more accurate, filtered estimate of the data. Additionally, data trending can include generating predicted likely future values for the sensor data. Each of these data trending functions facilities prognosis and fault detection in the mechanical systems.

Current systems have used various statistical techniques for filtering data. As examples, past trending systems have used such as Kalman filters or exponential filters to filter data. Unfortunately, these current trending systems suffered from many limitations. One particular limitation in current trending systems is a lack of accuracy. Thus, these trending systems are unable to accurately determine current sensor values or predict likely future values. This lack of accuracy limits the effectiveness of the prognosis and fault detection system, resulting in potentially unexpected faults and/or false detection of future faults.

Thus, what is needed is an improved system and method for trending data in mechanical systems that offers improved accuracy and reliability.

BRIEF SUMMARY OF THE INVENTION

The present invention provides a system and method for trending performance in a mechanical system. The trending system includes a performance estimator and a predictive trending mechanism. The performance estimator receives sensor data from the mechanical system and generates performance parameter estimates for the mechanical system. The performance parameter estimates are parametric data that are indicative of performance in the mechanical system. The performance parameter estimates are passed to a predictive trending mechanism. The predictive trending mechanism determines an estimated trend for the performance parameter estimates through monotonic regression of the performance parameter estimates. The estimated trend of the performance parameter estimates can include filtered values of the performance parameter estimates and/or predictions of future performance parameters.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for trending performance in a mechanical system. The trending system receives sensor data and generates performance parameter estimates. The trending system then determines an estimated trend for the performance parameter estimates through monotonic regression of the performance parameter estimates.

Figure 1:
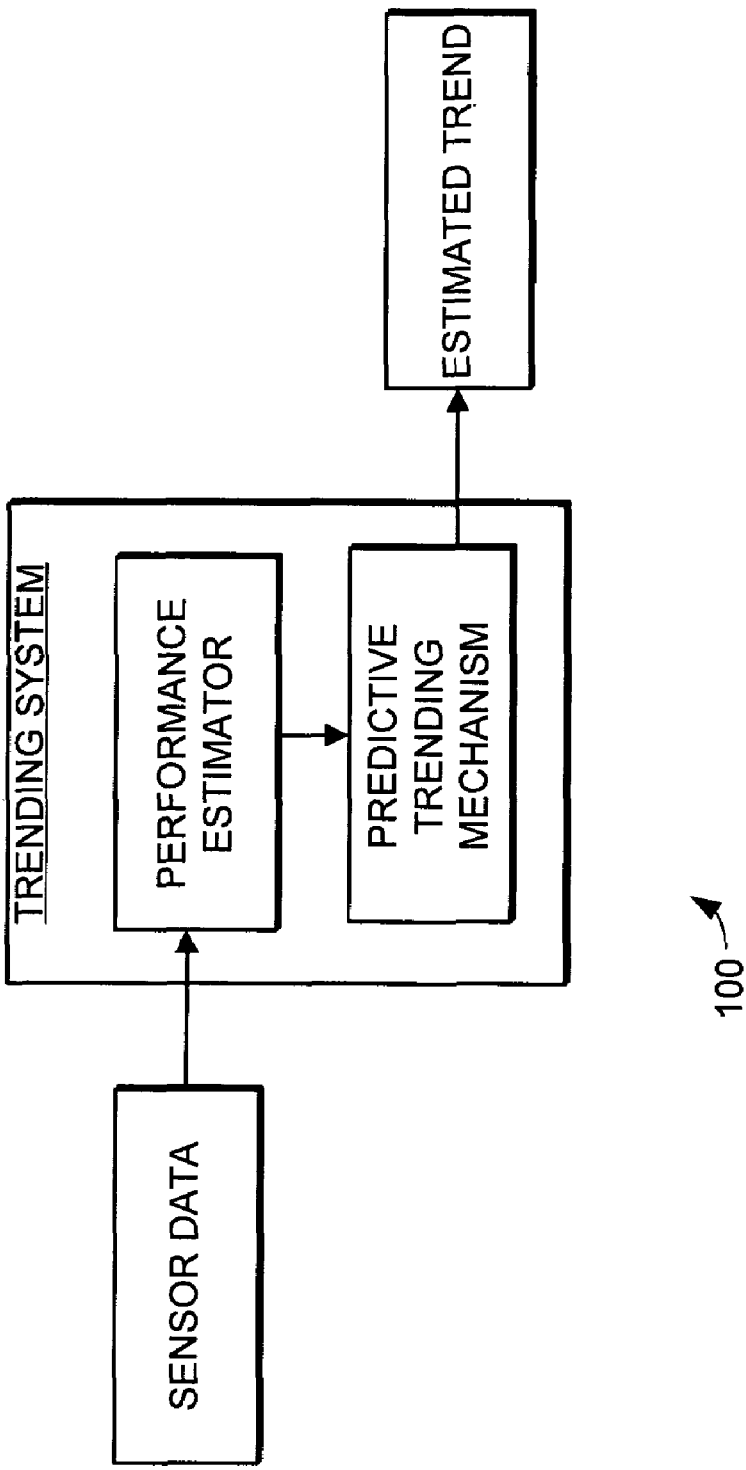
FIG. 1 is a schematic view of a trending system system.

Turning now to FIG. 1, a schematic view of a trending system 100 is illustrated. The trending system 100 includes a performance estimator and a predictive trending mechanism. The performance estimator receives sensor data from the mechanical system and generates performance parameter estimates for the mechanical system. The performance parameter estimates are parametric data that are indicative of performance in the mechanical system. The performance parameter estimates are passed to a predictive trending mechanism. The predictive trending mechanism determines an estimated trend for the performance parameter estimates through monotonic regression of the performance parameter estimates. The estimated trend of the performance parameter estimates can include filtered values of the performance parameter estimates and/or predictions of future performance parameters.

The trending system uses monotonic regression to generate the estimated trend of the performance parameter estimates. Monotonic regression, as the term is used in this application, is a statistical technique for trending data that assumes that the underlying trend is monotonic and produces a monotonic estimated trend output. The estimated trend output is optimal in the sense of a chosen statistical criterion. As further described in this application, a monotonic regression can provide an optimal nonlinear trending for determining trends of performance parameters based on noisy sensor data. Monotonic regression relies upon the assumption that the performance will only deteriorate with time. This assumption is reasonable for performance parameters configured to be associated with accumulating wear and damage to mechanical systems. By relying upon this assumption, monotonic regression facilitates reliable detection of fault conditions and accurate estimation of even weak trends in very noisy data.

In one implementation of monotonic regression, the trend is determined as a maximum likelihood estimate of the orbit in a hidden Markov model. This model assumes a one-sided exponentially distributed noise in the performance parameter. This noise model leads to a nonlinear filter where the trend can be estimated by solving a quadratic programming (QP) problem. While this method is more computationally complex than traditional Kalman filters, which assume Gaussian distributed noise, it offers trending that is vastly superior in performance.

Figure 2:
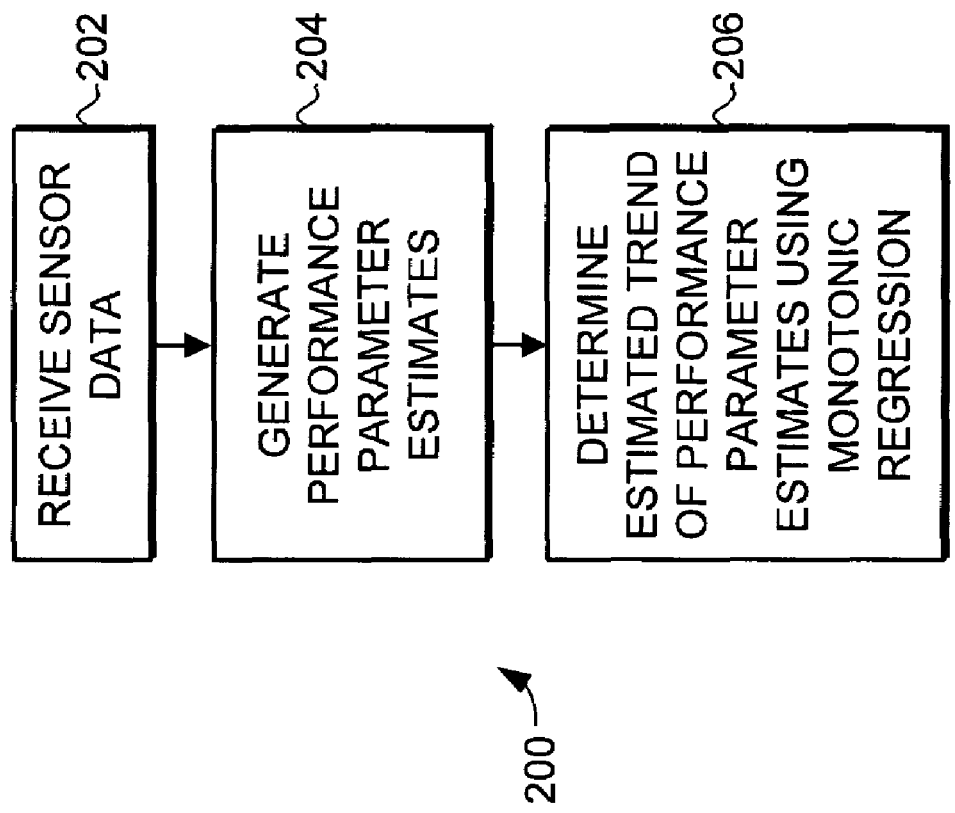
FIG. 2 is a flow diagram illustrating a trending method method.

Turning now to FIG. 2, a method 200 is illustrated for trending performance in a mechanical system. First step 202 is to receive sensor data from the mechanical system. This can include receiving sensor data directly from sensors on the mechanical system and it can include receiving data from secondary sources. Furthermore, the sensor data can comprise actual raw sensor data, other sensor data values derived from raw sensor data by data processing, or a combination of both.

The next step 204 is to generate performance parameter estimates from the sensor data. The performance parameter estimates are parametric data that are indicative of performance in the mechanical system. The performance parameter estimates and indicative of performance in the mechanical system, and are as such are representative of accumulating wear and/or damage in the mechanical system. As will be described in greater detail later, the performance parameter estimates are designed and implemented to monotonic, such that they can be assured to degrade with time as wear accumulates in the mechanical system.

As one example, the performance parameter estimates can be generated from residuals that are derived from sensor data. In this implementation, residuals are generated by comparing the received sensor data to expected sensor values and determining the difference. Generally, the expected sensor values are provided by a model of the mechanical system. The model receives sensor data and generates expected values for sensor data. It should be noted that the expected values generated by the model can comprises the same set of originally received sensor values, a subset of the originally received sensor values, and/or can comprises different sensor values altogether.

The next step 208 is to determine an estimated trend of the performance parameter using monotonic regression. This estimated trend of the performance parameter estimates can include filtered values of the performance parameter estimates and/or predictions of future performance parameters. In filtering values of the performance parameter estimates the estimated trend can provide more accurate performance parameters, reducing or eliminating the effects of noise in the system. In predicting future performance parameters the estimated trend can determine a predictive envelope of future values used to predict future performance in the mechanical system.

Monotonic regression relies upon the assumption that the performance represented by the performance parameter will only deteriorate with time. This assumption is reasonable for performance parameters that are designed to be associated with accumulating wear and damage to mechanical systems. Monotonic regression can provide an optimal nonlinear trending for determining trends of performance parameters even when provided noisy sensor data.

In one implementation of monotonic regression, the trend is determined as a solution to a quadratic programming problem. The solution to the quadratic programming problem provides filtered performance parameter values that more accurately represent the performance of the mechanical system.

As one specific example, the method 200 can be used for trending performance in turbine machinery such as a turbine engine system. In a turbine engine implementation, step 202 is performed by receiving sensor data from the turbine engine and other aircraft systems. For example, the received sensor data be taken directly from the engine such as fuel flow, exhaust gas temperature and engine speed. As other examples the sensor data can include data taken from other systems on the aircraft, such as airspeed, altitude and ambient temperature.

In step 204 for a turbine engine, the performance parameter estimates can be generated based on residuals generated from the received sensor data. For example, expected sensor values are generated by a performance model of the turbine engine. The turbine engine performance model receives sensor data such as airspeed data, altitude data, and ambient temperature data. From that data, the turbine engine performance model can generate expected values for exhaust gas temperature and engine acceleration. These generated expected values can then be compared to corresponding received sensor values to generate the residual. The resulting residuals are then used to create the performance parameter estimates.

In the turbine engine example, the performance parameter estimates can comprises a variable such as one that tracks turbine efficiency. Turbine efficiency is a function of wear and damage in the turbine engine. A performance parameter can be designed and implemented to indicate the turbine efficiency. This turbine efficiency performance parameter can be estimated based on the residuals for measured sensor data such as fuel flow and EGT. During analysis, the residuals for the measured sensor data are used to generate estimates of the turbine engine performance parameter. Because the turbine efficiency performance parameter tracks performance that is associated with wear in the turbine engine, it can be reasonable assumed to be monotonic—meaning that the associated performance will only degrade with time absent some intervening maintenance or repair.

Finally in step 206 for a turbine engine, monotonic regression can be used to trend turbine efficiency parameters. This trending can include filtering the performance parameter estimates of turbine efficiency to determine the actual performance parameters from relatively noisy estimates. Furthermore, this can include, the predictions of future turbine engine efficiency performance parameters based on the current trends in the performance parameter. This information can then be used to determine when a turbine engine needs to be pulled for repair or other maintenance action taken.

Figure 3:
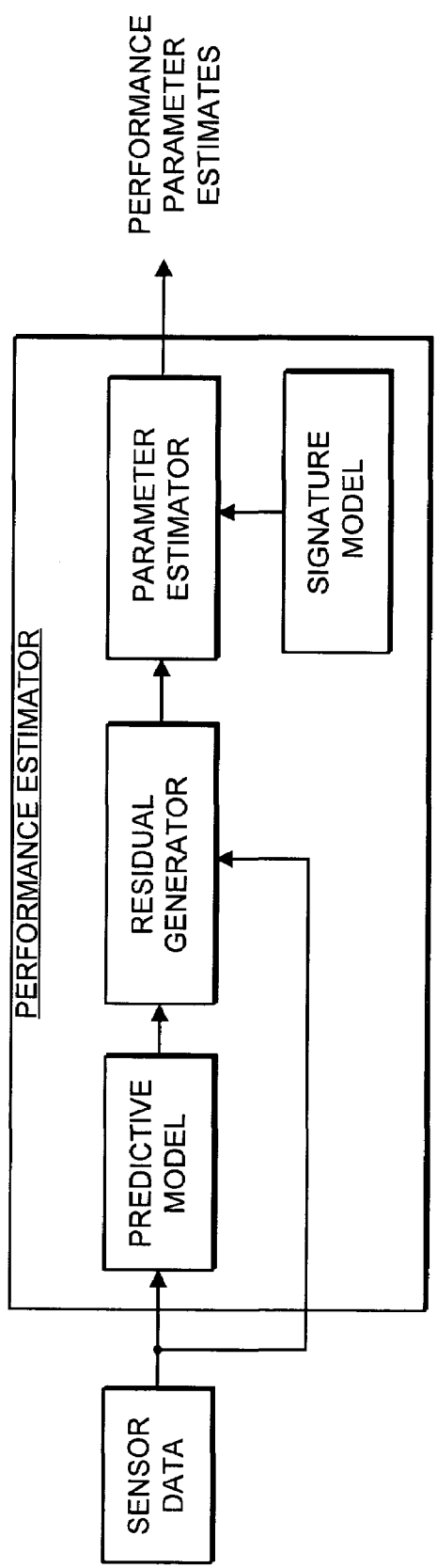
FIG. 3 is a schematic view of a exemplary embodiment performance estimator.

Turning now to FIG. 3, a performance estimator 300 for mechanical systems is illustrated. Performance estimator 300 is exemplary of the type of performance estimators that can be used in the trending system of the present invention. The performance estimator 300 includes a predictive model, a residual generator, a parameter estimator and a signature model.

In general, the performance estimator 300 receives sensor data from the mechanical system and generates performance parameter estimates from that sensor data. The performance parameter estimates can be any type parametric data that are derived from the sensor data and are indicative of some type of performance in the mechanical system.

The sensor data received by the performance estimator 300 can include sensor data directly from sensors on the mechanical system and it can include sensor data from secondary sources, or a combination of both. It should also be noted that the sensor data received by the performance estimator 300 could include actual raw sensor data, other data values derived from sensor data processing, or a combination of both. The sensor data is passed to the predictive model and to the residual generator.

The predictive model receives sensor data and generates expected output values from that sensor data. Again, this sensor data can include actual raw sensor data, other data values derived from the raw sensor data, or a combination of both. The predictive model can use a wide variety of different systems and methods for generating the expected output values from the sensor data. For example, a predictive model can be developed using a physics model of the system that is validated against experimental data. As another example, the predictive model can be developed with data-driven techniques such as neural networks. In this implementation, a neural network is configured and trained to output expected output values based on received sensor data. It should be noted that the expected output values generated by the model can comprise the expected values for the originally received sensor data values, a subset of the original sensor data values, or for different sensor values altogether, such as data derived from the originally received sensor data values as a result of mathematical signal processing.

The expected output values are passed to the residual generator. The residual generator compares the expected output values to the actually observed values to determine residual differences. The residual difference could be a simple linear difference, or a more complex calculation of the differences between the actually observed values and the expected output values.

The prediction residuals are passed to a parameter estimator. The parameter estimator estimates of the degradation of the performance parameters based on the residuals and a performance deterioration signature model. The signature model is a description of the relationship between the prediction residual value changes and changes (deterioration) in the performance parameters. For example, a signature model can be developed to describe how certain changes in selected performance parameters corresponding to specific types of mechanical system deterioration affect the prediction residuals. The signature model can thus serves as the basis for generating performance parameter estimates from the received residual values. As one example a linearized model of the relationship between the performance parameter changes might be used and and estimate of the performance parameter changes (degradations) can be obtained by a generalized least square method. Of course other more general nonlinear models and other methods for estimating the performance parameter changes from the residuals can be employed within the framework of this system.

The parameter estimator thus generates performance parameter estimates based on the signature model and the received residuals. The derived performance parameter estimates are indicative of performance in the mechanical system, and as such are representative of accumulating wear and/or damage in the mechanical system. The performance parameter estimates are designed to be monotonic, such that they can be assured to track performance that degrades with time as the mechanical system wears.

Figure 4:
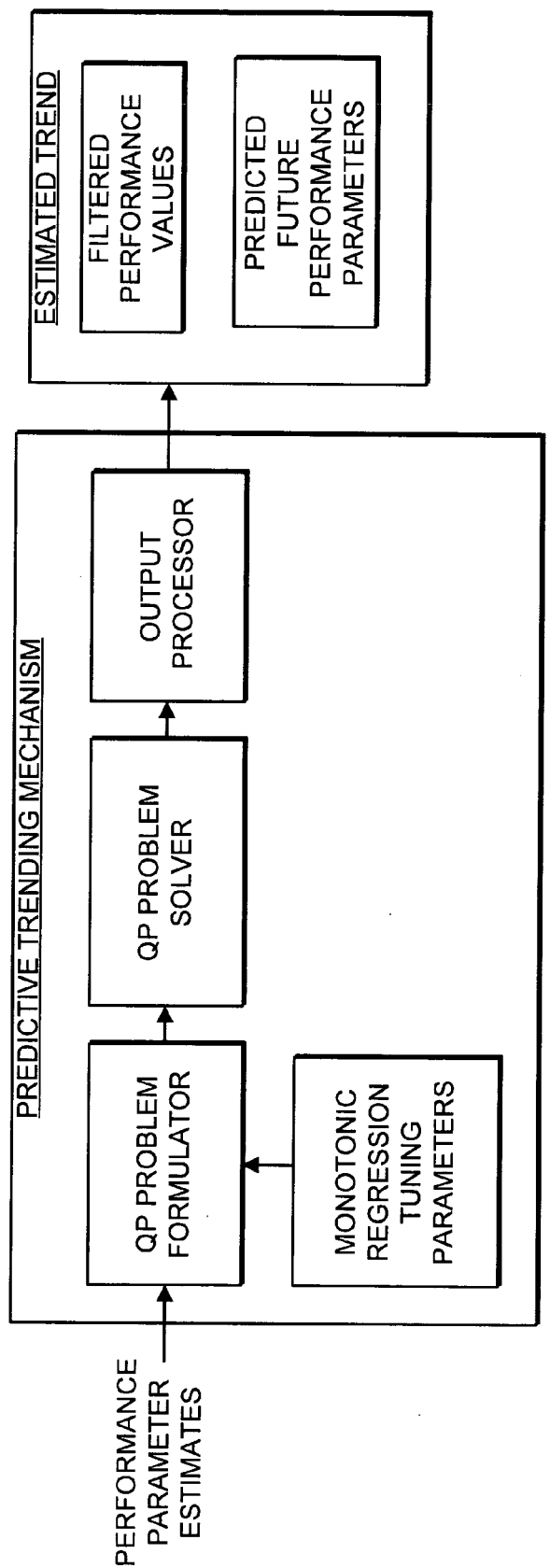
FIG. 4 is a schematic view of an exemplary embodiment predictive trending mechanism.

Turning now to FIG. 4, a predictive trending mechanism 400 for trending mechanical systems is illustrated. Predictive trending mechanism 400 is exemplary of the type of monotonic regression trending mechanism that can be used in the trending system of the present invention. The predictive trending mechanism 400 includes a QP problem formulator, a QP problem solver, an output processor and monotonic regression tuning parameters. In general, the predictive trending mechanism 400 receives performance parameter estimates from the performance estimator and generates an estimated trend of the performance parameter estimates.

The predictive trending mechanism 400 determines the estimated trend of the performance parameter using a monotonic regression computational technique. In the illustrated embodiment, the monotonic regression computation is performed by solving a properly stated quadratic programming (QP) problem. To enable this, the performance parameter estimates are passed to the QP problem formulator. The QP problem formulator takes the performance parameter estimates and organizes the performance parameter estimates into a format that the QP problem solver can work with. Typically, this would involve taking a batch of performance parameter estimates and formatting that batch into a suitable data set, such as a set of matrices or sparse arrays required by the QP solver. The size of the batch would depend upon the application and the available number of performance parameter estimates. As one example, several thousand performance parameter estimates can be formatted and inputted to the QP problem solver when an estimated trend is to be determined.

Additionally, the QP problem formulator receives monotonic regression tuning parameters. The monotonic regression tuning parameters are used to determine the computational and estimation tradeoffs used in solving the quadratic programming problem. A more detailed example of monotonic regression tuning parameters and how such values can be determined is discussed below in greater detail.

The QP problem solver receives the formatted performance parameter estimates and the tuning parameters and generates a set of filtered performance parameters. The filtered performance parameters more accurately represent the true performance of the mechanical system the originally received performance parameter estimates. Specifically, the filtered performance parameters more accurately represent the underlying performance by reducing the effects of noise in the original system data. Typically, an entire batch of filtered performance parameter estimates is generated as the solution to one quadratic programming problem. Thus, the QP problem solver offers a batch mode solution to generating filtered performance parameter estimates.

The QP problem solver can be implemented with a variety of quadratic programming tools. For example, QP solving tools are available as part of the MatLab Optimization Toolbox, including a function QUADPROG.M that can be used to solve these types of quadratic programming problems. Of course, other freely available or commercial QP solving packages could also be used, including NAG software libraries. Most commercially available QP solvers function by imposing a linear constraint of a monotonic data change in the quadratic programming problem. Many different modern QP solver packages are available with the desirable feature of being based on Interior Point methods. The QP solvers based on Interior Point methods can provide a fast and reliable solution of very large QP problems with several thousand variables.

The filtered performance parameters estimated by the QP solver are passed to the output processor. The output processor takes the filtered performance parameters and formats the output. Additionally, the output processor can generate predictions of future performance parameters. The predictions of future performance parameters are used to prognosticate the future performance of the system, and can thus be used to determine when future maintenance will be required for the mechanical system. The predicted future performance parameters can be calculated using many different suitable techniques. For example, when using a second-order monotonic regression analysis, the predictions of future performance parameters can be obtained by extending the linear trend estimated at the last available data point. An example of such a second-order monotonic regression analysis will be discussed in greater detail below. Other suitable techniques could be used to predict future performance parameters. For example, a least squares analysis (e.g., least square curve fit) of the filtered performance parameters can be used to determine predicted future performance parameters.

The predicted future performance parameters can be obtained in a variety of forms, including as sets of discrete predicted future values or in the form of a linear function describing the current trend. In any case, the predictions of future performance parameters can then be used to prognosticate as to the future evolution of performance of the mechanical system.

A detailed example of a specific monotonic regression technique will now be discussed. In this example, the received performance parameter estimates are an observed data sequence $Y_N$. Monotonic regression is used determine the orbit or underlying trend $x(t)$ from the received performance parameter estimates $Y_N$, where the underlying trend $x(t)$ is made up of a data sequence of filtered performance parameters $X_N$. Stated another way, the or underlying trend $x(t)$ of a filtered performance parameters $X_N$ is based on an observed data sequence of performance parameter estimates $Y_N$, where $X_N$ and $Y_N$ are defined as:

$$X_N = \{x(1), \ldots, x(n)\} \quad (1.)$$

$$Y_N = \{y(1), \ldots, y(n)\} \quad (2.)$$

And where the underlying performance parameter data is assumed to be monotonic such that:

$$\{x(1) \leq x(2) \leq \ldots \leq x(n)\} \quad (3.)$$

The underlying trend or maximum orbit $x(t)$ can be found with the following optimization problem by solving for the $x(t)$ sequence that optimizes the loss index J:

$$J = \frac{1}{2Q_0}[x(1) - x_0]^2 + \quad (4.)$$

$$\frac{1}{2\Gamma} \sum_{t=1}^{N} [x(t) - y(t)]^2 + \lambda \sum_{t=1}^{N} [x(t) - x(t-1)] \to \min$$

where $Q_0$ is the initial condition covariance, $\Gamma$ is the assumed covariance of the gaussian observation noise, and $\lambda$ is the assumed covariance of the exponential one-sided noise driving the underlying trend evolution. The noise covariances in equation 4 play a role analogous to the noise covariances in a usual Kalman Filter. These covariances could be estimated from the data, but ultimately are used as the tuning parameters of the filter. With equation 3 taken as a hard constraint, the last sum cancels out except for x(1) and x(n). In the case where no apriori information about $x_0$ is available, it can be assumed that the initial condition covariance $Q_0 \to \infty$, and the first term of equation 4 can be dropped. Solving equation 4 will then yield a Maximal Likelihood estimate of the orbit x(t). The Maximal Likelihood estimation problem in this case can be re-written in the more compact form as:

$$J = \frac{1}{2}\|X_N - Y_N\|^2 + \frac{1}{\beta}F^T X_N \to \min \quad (5.)$$

$$DX_N \geq 0 \quad (6.)$$

$$F^T = [1 \ 0 \ 0 \ \ldots \ -1] \quad (7.)$$

$$D = \begin{bmatrix} 1 & -1 & 0 & \ldots & 0 \\ 0 & 1 & -1 & \ldots & 0 \\ \vdots & \vdots & \vdots & \vdots & \vdots \\ 0 & 0 & 0 & \ldots & 1 \end{bmatrix} \quad (8.)$$

where $\beta = \lambda/\Gamma$. To determine the underlying trend, equation 5 is solved for a data sequence $X_N$ of filtered performance parameters that optimizes the loss index J. This is a quadratic programming problem that can be solved with computational methods such as interior point methods. For example, it can be solved with QUADPROG.M function or other QP related codes provided as part of the Matlab Optimization toolbox.

As one example, such a problem can be solved assuming the initial condition covariance $Q_0$ is infinite, and the second term in equation 5 disappears. In this case, the Maximum Aposteriori Probability (MAP) becomes a Maximum Likelihood (ML) estimate and depends upon a single tuning parameter $\beta$.

The tuning parameter $\beta$ is preferably selected empirically to achieve the desired performance of the system, to achieve the desirable tradeoff in filter noise rejection and trend following performance. In general for a large $\beta$ the system will draw a monotonic regression that would jump in the end to accommodate for the last data point that is above the trend. As $\beta$ goes to infinity, the regularization penalty given by the last term in equation 4 vanishes. In that case the trending becomes very sensitive to outliers, especially those coming as the first or last point of the data batch. For a small $\beta$, the system assumes that the observed in data might be a random outlier and follows an average monotonic regression trend observed through previous data points. As $\beta$ goes to zero the regularization penalty given by the last term in equation 4 dominates the optimization problem. Thus, the tuning parameter β is essentially a smoothing parameter, analogous to a time constant of first-order exponential filter, and is best determined in many cases through trail and error.

Figure 5:
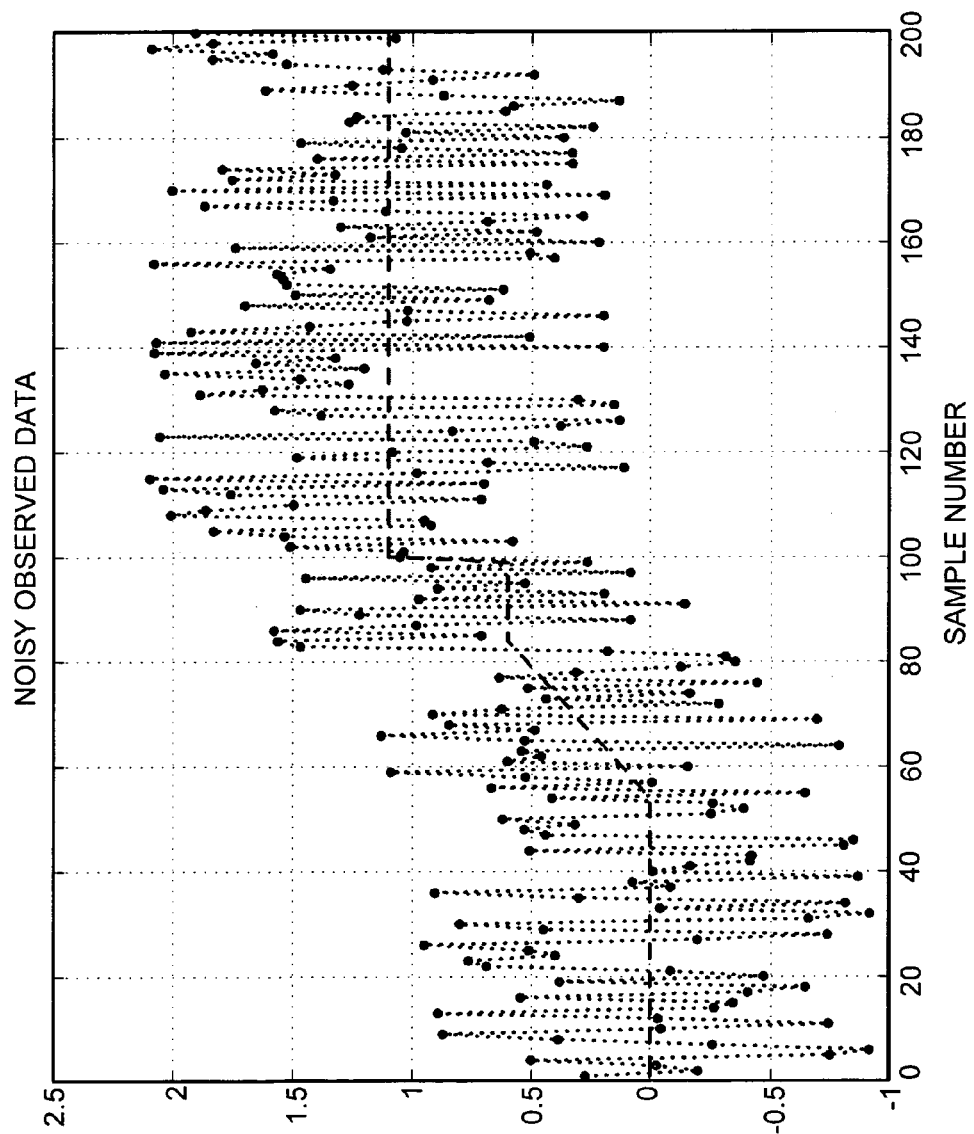
FIG. 5 is a graph of exemplary noisy data set and an underlying trend.

Turning now to FIG. 5, a graph 500 illustrates an exemplary data set used for testing the trending system. The graph 500 includes a dashed line showing the underlying trend (i.e., the orbit), which includes as a slope 0.02 ramp with a 30 sample duration and then, after a 15 sample interval, a 0.5 step. Also illustrated in graph 500 is a data set derived from the underlying trend by adding uncorrelated random noise uniformly distributed on the [−1,1] interval. The resulting noisy data set was then used to test the trending system to determine the ability of the trending system to determine the underlying trend from noisy data.

Figure 6:
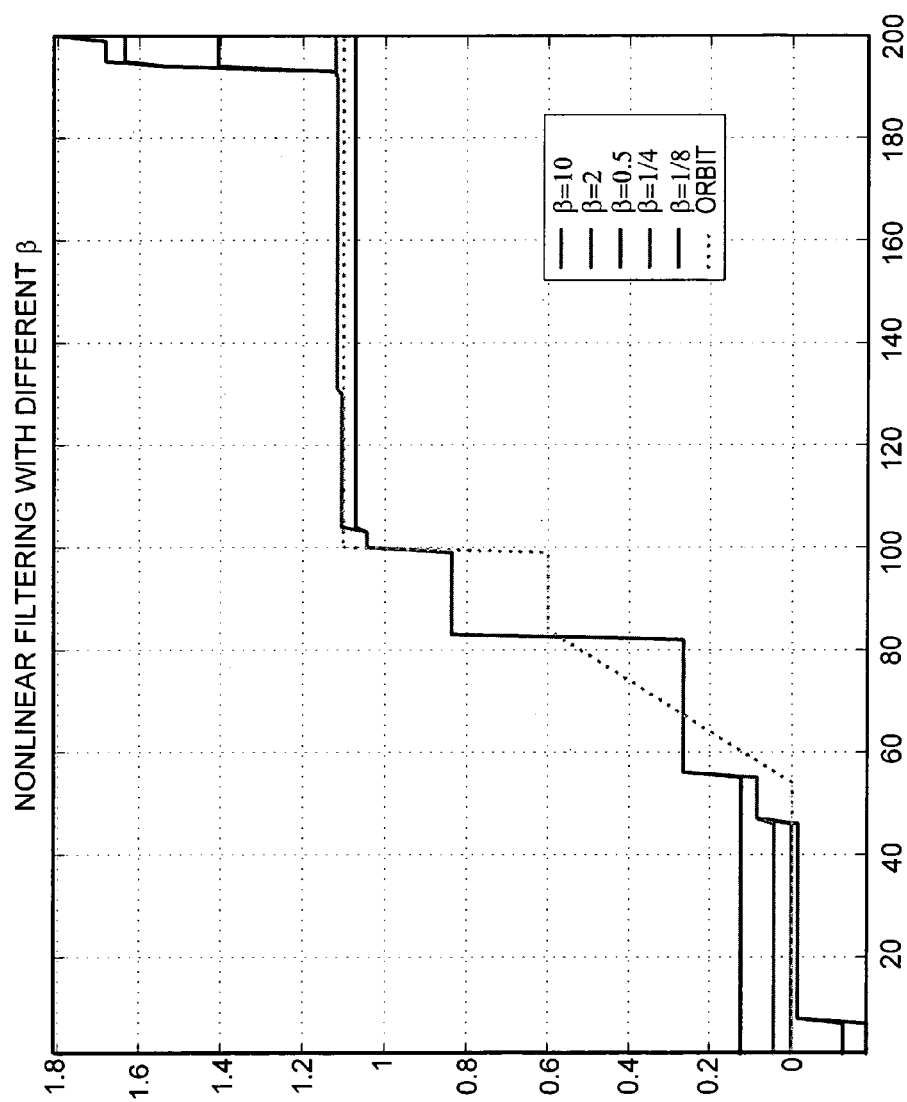
FIG. 6 is a graph of several exemplary estimated trends obtained using monotonic regression.

Turning now to FIG. 6, a graph 600 illustrates several estimated trends obtained from the noisy data of FIG. 5 using equations 5–8 as part of an exemplary trending system. Each of these estimated trends is made up of a data sequence $X_N$ of performance parameters that have been "filtered" to reduce the effects of noise in the original data. Specifically, graph 600 shows several estimated trends obtained using different values of the tuning parameter, β={10, 2, ½, ¼, ⅛}. As can be seen, each of the estimated trends closely follows the overall pattern of the original underlying trend data, with the main differences arising in the handling of boundary conditions. For larger values of β(i.e., 10, 2, ½) the trends only different in the first and last seven points. The middle part of the estimate is the same. For the smaller values of β(i.e., ¼, ⅛) the edge effects propagate further inside but still the middle part of the estimate is essentially the same.

Figure 7:
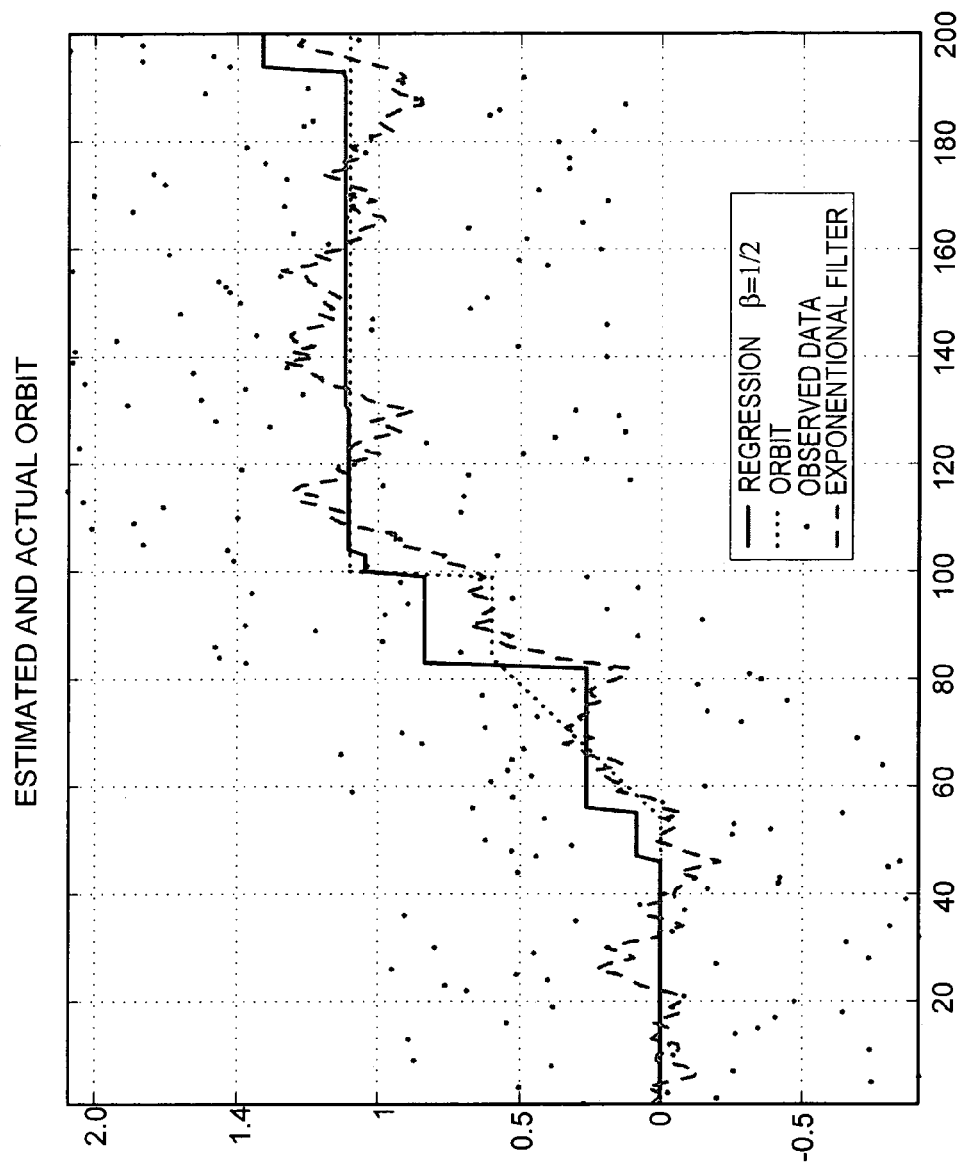
FIG. 7 is a graph of another estimated trend obtained using monotonic regression.

Turning now to FIG. 7, a graph 700 shows the results of a monotonic regression using a tuning parameter value of β=½ compared to results obtained using a conventional exponential filter solution. Also illustrated in graph 700 is the raw observed data and the underlying trend. As is illustrated in graph 700, the estimated trend determined by monotonic regression has less delay and is overall much closer to the underlying trend then the result generated with exponential filtering. Thus, this example shows that monotonic regression can provide improved trending performance over traditional exponential filtering methods.

While the monotonic regression technique described in equations 1–10 is adequate for many implementations, it may not be sufficient to adequately describe systematic deterioration trends in certain data sequences. Such trends show an increased deterioration for each new data point which would appear as an upward slope on the trend, while the described first-order monotonic regression only registers upward jumps in the data and yields trends consisting of many flat segments. In fault diagnostics and prognostics, systematic trends are important indications of impending failure and as such can be used for evaluating the need for preventive maintenance. A second-order monotonic regression analysis can be performed to more accurately determine systematic trends from performance parameter estimates. The second-order monotonic regression analysis can be conveniently used in predicting future values of the performance data, sometimes referred to as prognostication or predictive trending. Specifically, since the second order monotonic regression estimates both a slope and intercept of the trend at each data point, it can be conveniently used for prognostics, by assuming that the slope and intercept estimated at the last point describe a straight line indicative of the future deterioration.

A detailed example of a specific second-order monotonic regression technique will now be discussed. In this example, the received performance parameter estimates are an observed data sequence $Y_N$. Monotonic regression is used to determine the orbit or underlying trend x(t) from the received performance parameter estimates $Y_N$, where the underlying trend x(t) is again made up of a data sequence of filtered performance parameters $X_N$. In the second-monotonic regression case, the underlying trend includes two components such that x(t)=[$x_1$(t) $x_2$(t)].

In this model, $x_1$(t) describes the systematic deterioration rate that defines the prognostics of the trend and will only increase with time. The deterioration rate $x_1$(t) could include a systematic average performance loss for the cycle. The model can be conveniently used for describing the accumulation of secondary damage in the system caused by a primary fault condition. In that case, $x_1$(t) corresponds to the intensity of the primary fault condition and $x_2$(t) describes the secondary damage accumulating because of this primary fault condition. The secondary damage keeps accumulating as long as the primary damage exist and the rate of its accumulation can only grow because the primary damage could only grow.

One example of a primary/secondary damage mechanism for a turbine engine is a primary damage in the combustor leading to hot streak in the turbine gas flow. This hot steak would stress the turbine and cause an accumulation of the turbine blade damage (erosion, burn through, soot, material fatigue). The severity of the primary combustor fault would increase with time leading to a faster accumulation of the secondary damage of the turbine blades.

As another example of an application for second-order monotonic regression, in turbomachinary the secondary damage model could be combustor liner or nozzle damage leading to a distorted temperature pattern. This fault condition would persist and grow worse in time. The observed effect of such would be indirect, through a performance loss of high-pressure section. A hot streak caused by the combustor fault would lead to deterioration (burn through) of turbine blades and vanes at each flight cycle. The result is a consistently growing performance loss.

In second-order monotonic regression, the underlying trend x(t) is again assumed to monotonic. Specifically, in this case the underlying trend x(t)=[$x_1$(t) $x_2$(t)] is assumed to be monotonic such that:

$$\{x_1(1) \leq x_1(2) \leq \ldots \leq x_1(n)\} \{x_2(1) \leq x_2(2) \leq \ldots \leq x_2(n)\} \qquad (9)$$

The maximum a posteriori probability estimate of the underlying trend x(t) can be found with the following optimization problem by solving for the x(t)=[$x_1$(t) $x_2$(t)] sequences that optimize the loss index J:

$$J = const + \frac{1}{2}[x(1) - x_0]^T Q_0^{-1}[x(1) - x_0] + \frac{1}{2\Gamma}\sum_{t=1}^{N}[y(t) - x_2(t)]^2 + \frac{1}{\lambda_1}[x_1(N) - x_1(1)] + \frac{1}{\lambda_2}[x_2(N) - x_1(2)] + \frac{1}{\lambda_2}\sum_{t=1}^{N}x_1(t) \to \min \qquad (10.)$$

Where const is constant term not influencing the solution, $Q_0$ is the initial condition covariance, Γ is the covariance of the gaussian observation noise and $\lambda_1$ and $\lambda_2$ are the covariances of the exponential one-sided noises driving the evolutions of the primary damage and the secondary damage variables $x_1(t)$ and $x_2(t)$ respectively. In the case where no apriori information about $x_0$ is available, it can be assumed that the initial condition covariance $Q_0 \to \infty$, and the second term of equation 10 can be dropped. Solving equation 10 will then yield a Maximal Likelihood estimate of the underlying trend x(t). The Maximal Likelihood estimation problem in this case can be re-written in the more compact form as:

$$J = \frac{1}{2}\|X_{2,N} - Y_N\|^2 + F_1^T X_{1,N} + F_2^T X_{2,N} \to \min \quad (11.)$$

$$X_{1,N} = [x_1(1) \ldots x_1(N)]^T \quad (12.)$$

$$X_{2,N} = [x_2(1) \ldots x_2(N)]^T \quad (13.)$$

$$F_1^T = \left[\frac{1}{\beta_1} - \frac{1}{\beta_2} - \frac{1}{\beta_2} \ldots \left(-\frac{1}{\beta_1} - \frac{1}{\beta_2}\right)\right] \quad (14.)$$

Unlike the first-order monotonic regression problem, this second order monotonic regression problem is ill-defined (underspecified). That is, the Hessian of the quadratic form of equation 11 has only N nonzero singular values out of 2N total.

In this case, the Maximum Aposteriori Probability (MAP) becomes a maximum likelihood estimate and depends upon two tuning parameters $\beta_1$ and $\beta_2$. The parameter $\beta_2$ provides a penalty of the fault estimate x through observation time and is essentially similar to the parameter $\beta$ in the first-order monotonic regression problem. The parameter $\beta_1$ provides a penalty for the linear trend in the data and characterizes the amplitude of the driving noise $x_1^i$. Thus, as $\beta_1$ goes to zero the second-order monotonic regression estimate coincides with the first-order monotonic regression. Conversely, as $\beta_1$ goes to infinity only the average linear trend is estimated. Choosing parameters $\beta_1$ and $\beta_2$ would preferably be done to achieve a desirable tradeoff in the filter noise rejection and trend following performances. This is thus analogous with choosing the driving noise covariances in a second-order Kalman Filter, which is well understood for someone skilled in the art, and could follow the similar intuition.

Figure 8:
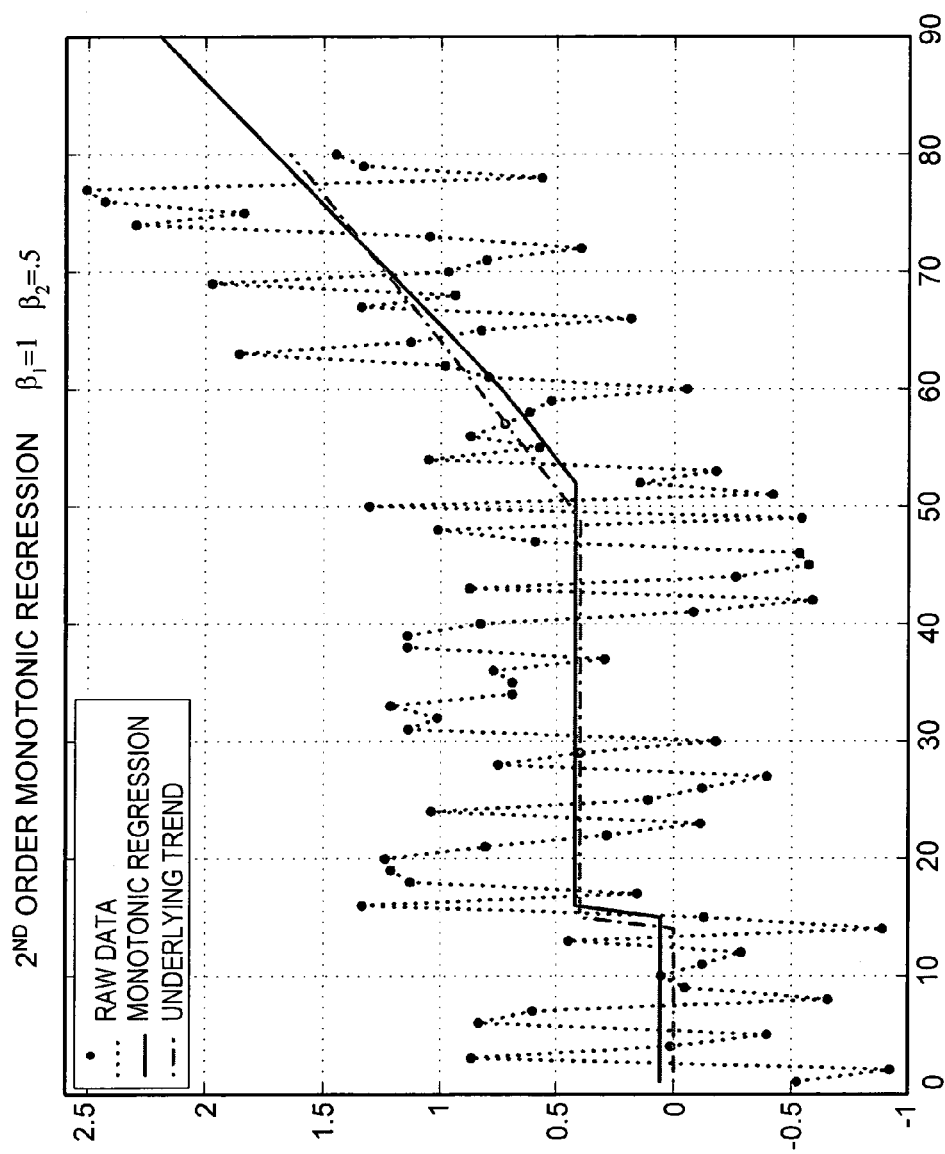
FIG. 8 is a graph of exemplary noisy data set, an underlying trend, and an estimated trend obtained using second-order monotonic regression.

Turning now to FIG. 8, a graph 800 illustrates an exemplary data set used for testing the second-order monotonic regression trending system. The graph 800 includes a dashed line showing the underlying trend, which held a constant value for 15 samples, then stepped up by 0.4 then was constant for 35 more samples, then started ramping up with the slope of 0.04 per sample. Also illustrated in graph 800 is a data set derived from the underlying trend (i.e., the orbit) by adding uncorrelated random noise uniformly distributed on the [−1,1] interval. The resulting noisy data set was then used to test the trending system to determine the ability of the trending system to estimate the underlying trend from noisy data.

Also illustrated in graph 800 are the trends obtained from the noisy data set by applying the second-order monotonic regression using equations 11–17. In this illustrated example, the tuning parameters were set at $\beta_1=1$ and $\beta_2=\frac{1}{2}$. Once again, the trend estimated by the system compares closely to the underlying trend despite the presence of noise in the data that has about the same or larger amplitude than the estimated signal.

Figure 9:
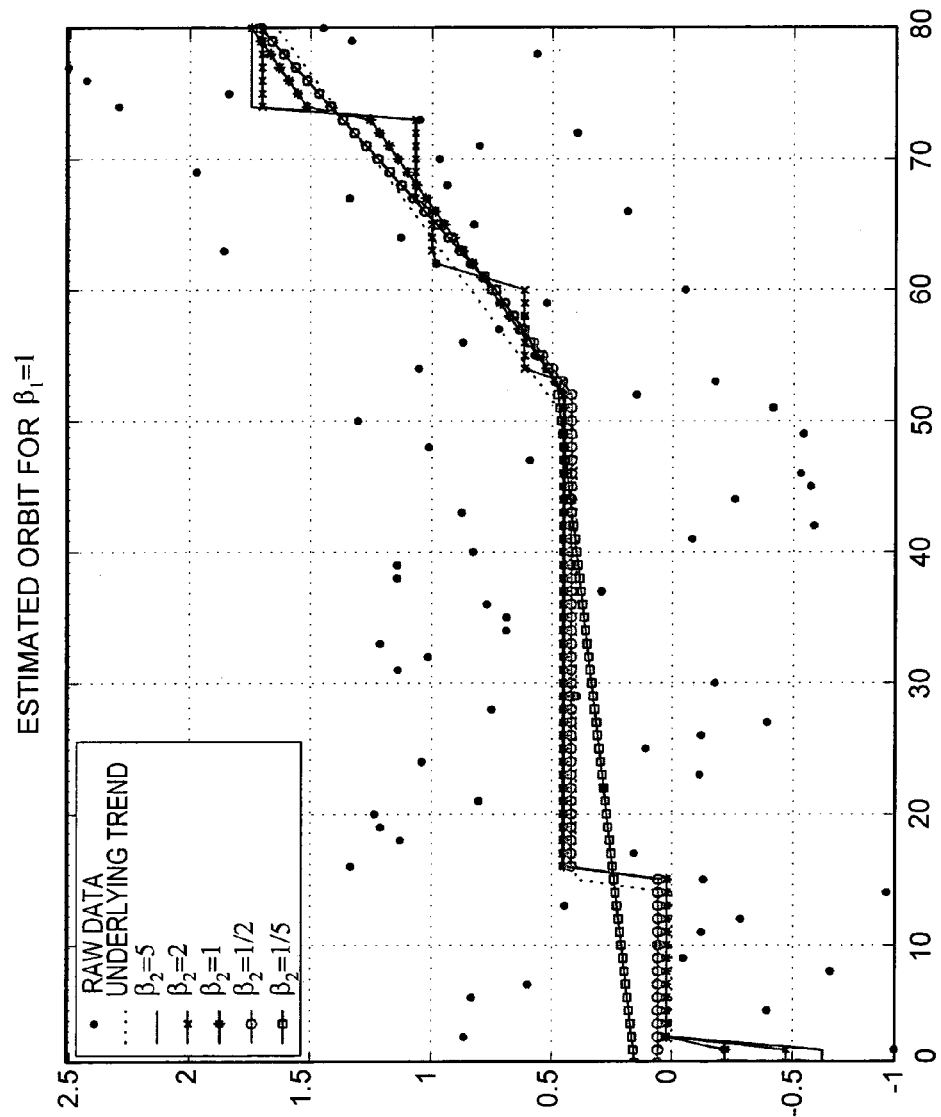
FIG. 9 is a graph of several estimated trends obtained using second-order monotonic regression.

Turning now to FIG. 9, a graph 900 illustrates several estimated trends obtained from the noisy data of FIG. 8 using equations 11–17 as part of an exemplary trending system using second-order monotonic regression. Specifically, graph 900 shows several estimated trends obtained using a value of tuning parameter $\beta_1=1$ and several different values of the tuning parameters $\beta_2=\{5, 2, \frac{1}{2}, \frac{1}{5}\}$. When $\beta_1$ is between 1 and 10 the trends look essentially the same.

Figure 10:
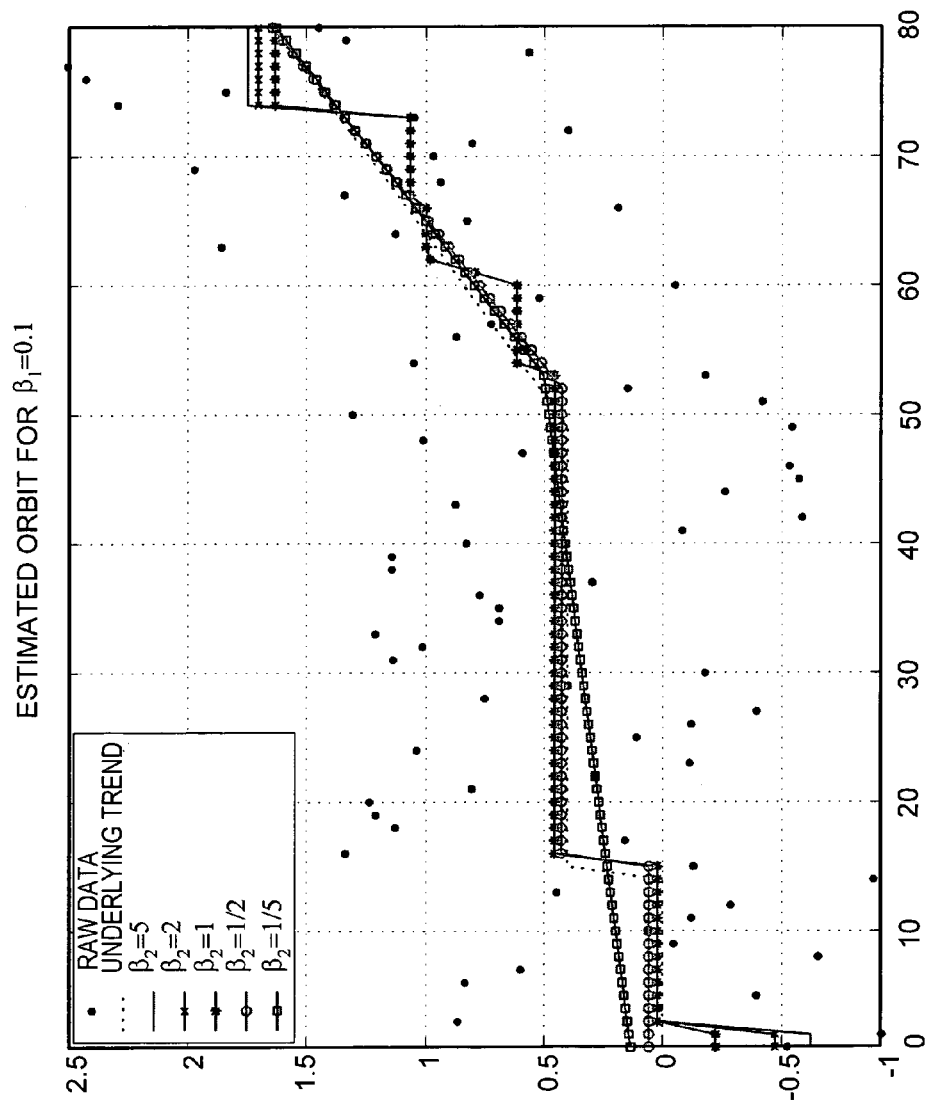
FIG. 10 is a graph of several estimated trends obtained using second-order monotonic regression.

Turning now to FIG. 10, a similar graph 1000 illustrates several estimated trends obtained from the noisy data of FIG. 8 using equations 11–17 and using a value of tuning parameter $\beta_1=\frac{1}{10}$ and several different values of the tuning parameters $\beta_2=\{5, 2, \frac{1}{2}, \frac{1}{5}\}$. These trends are only slightly different then those illustrated in graph 900. For a small $\beta_2$ (e.g., for $\beta_2=\frac{1}{5}$) the solver fits a concave piece-wise linear trend into the data. For a large $\beta_2$ (e.g., for $\beta_2=5$) the second order monotonic regression yields a piece wise constant trend, which is similar to a first order monotonic regression solution of the previous section. This is because the large $\beta_2$ corresponds to a large covariance $\lambda_2$ in the noise model. In turn, large state equation noise means slower filtering, and a slow filter for the coordinate $x_2$ means a piece wise constant solution that is not very response to changes in the data. Similarly, a small $\beta_2$ corresponds to a small covariance $\lambda_2$ and this leads to the part of the filter that follows the model for the coordinate $x_1$ providing the dominant (slow) dynamics yielding a piece-wise linear concave function.

Figure 11:
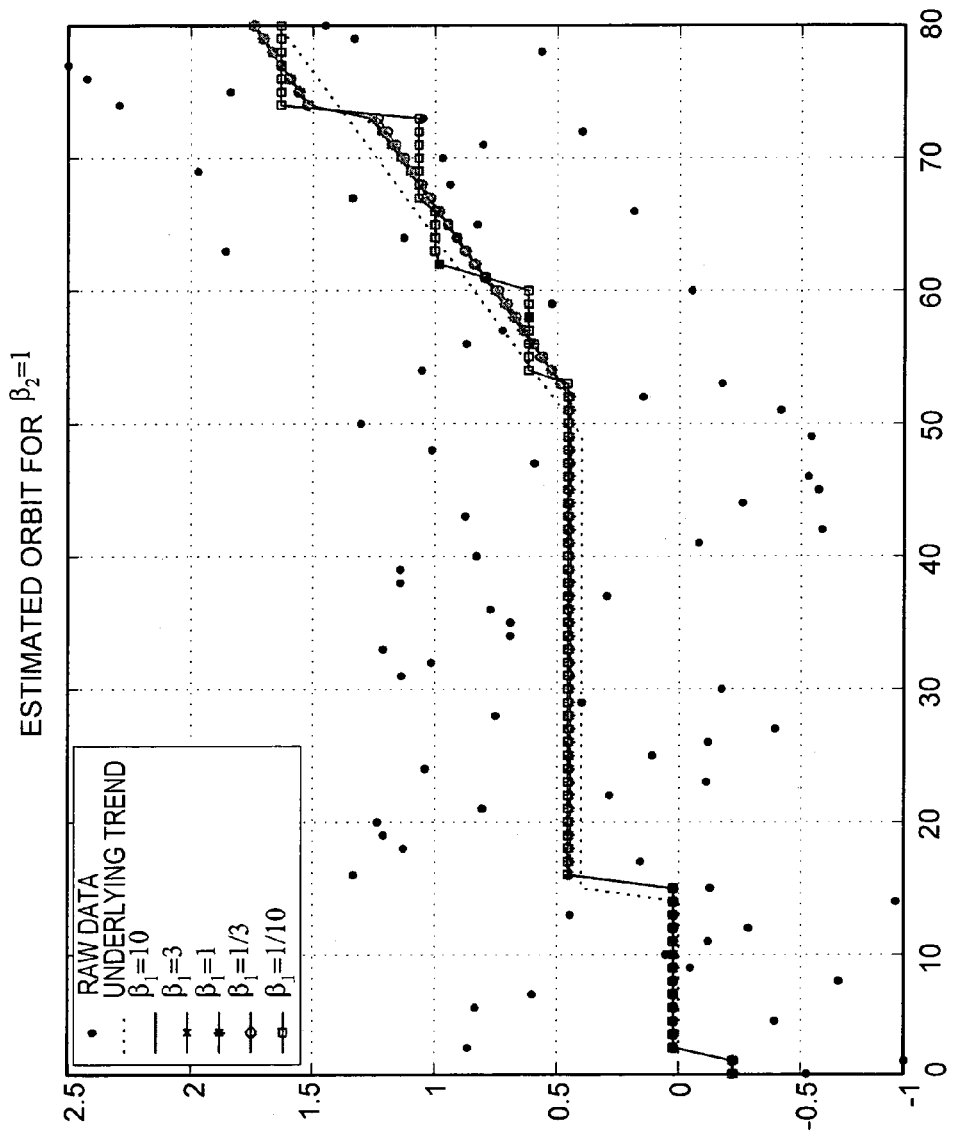
FIG. 11 is a graph of several estimated trends obtained using second-order monotonic regression.

Turning now to FIG. 11, a similar graph 1100 illustrates several estimated trends obtained from the noisy data of FIG. 8 using equations 11–17 and using a value of tuning parameter $\beta_2=1$ and several different values of the tuning parameters $\beta_1=\{10, 3, 1, \frac{1}{3}, \frac{1}{10}\}$. As discussed above, the obtained estimated trends are basically the same for the all values of $\beta_1$, with the only exception being $\beta_1=\frac{1}{10}$ that exhibits more discontinuities and jumps.

Figure 12:
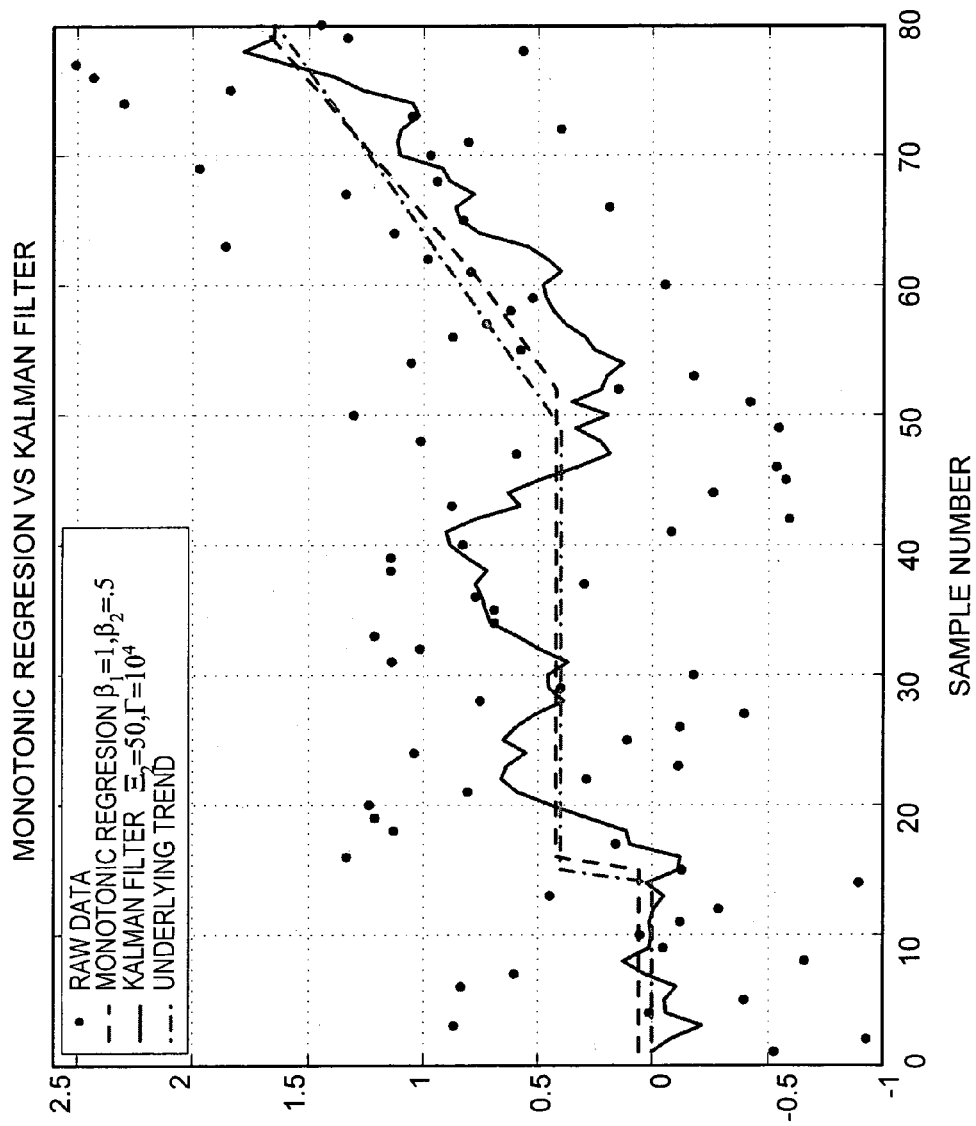
FIG. 12 is a exemplary noisy data set, an underlying trend, and an estimated trend obtained using second-order monotonic regression, and an estimated trend obtained using a Kalman filter.

Turning now to FIG. 12, a graph 1200 illustrates a comparison of estimated trends obtained using second-order monotonic regression compared to trends obtained using a traditional stationary Kalman filter. Specifically, graph 1200 illustrates the estimated trends obtained from the noisy data of FIG. 8 using equations 11–17 and using a value of tuning parameter $\beta_1=1$ and tuning parameter $\beta_2=\frac{1}{2}$ in a second order monotonic regression analysis. In addition, graph 1200 shows the raw data and the underlying trend. As one can see, the second order monotonic regression estimate recovers the underlying trend with far improved quality of estimation compared to the Kalman filter.

For some practical trending applications, the two above described methods (first-order monotonic regression trending and the second-order monotonic regression trending) can be combined together. As one example implementation, the second-order trending is applied to the end of the data sequence (e.g., the last 80 to 100 data points) and can serve to predict the trend into the future. The prediction can be obtained by extending the estimated solution of the second order analysis into the future by assuming that the future noises are zero. In this case it may be also be desirable to process the first part of the data sequence using the first order trending techniques that are typically scalable to a much larger sequence size. Thus, the two methods can be merged together though the boundary conditions to ensure monotonicity of the integrated trend.

Figure 13:
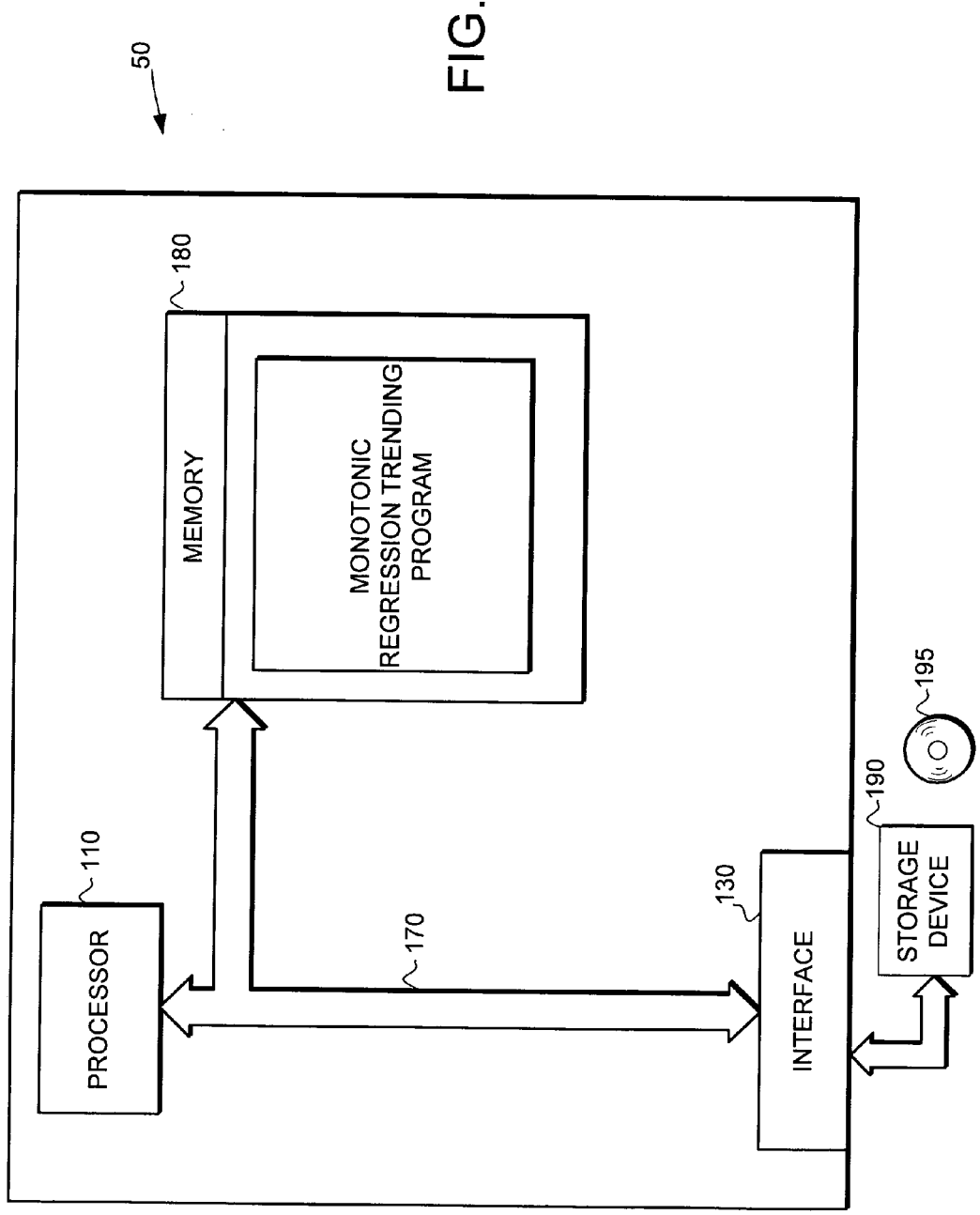
FIG. 13 is schematic view of an exemplary computer system implementing a trending system.

The trending system and method can be implemented in wide variety of platforms. Turning now to FIG. 13, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a fuzzy logic fault detection program, which includes a sensor data processor program and a fuzzy logic inference system program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 13, storage device 190 can comprise a disc drive device that uses discs 195 to store data.

In accordance with the preferred embodiments of the invention, the computer system 50 includes a monotonic regression trending program. Specifically during operation, the monotonic regression trending program is stored in memory 180 and executed by processor 110. When being executed by the processor 110, monotonic regression trending program receives sensor data and determines estimated trends of performance parameters derived from that sensor data. These estimated trends can be then used by a technician or other user to interact with the system in order to arrive at proper diagnostic and prognostics.

As one example implementation, the trending system can operate on data that is acquired from the mechanical system (e.g., aircraft) and periodically uploaded to an internet website. The monotonic regression analysis is performed by the web site and the results are returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

It should also be understood that while the present invention has been described as a trending system for trending turbine machinery performance, that the present invention can also be applied to other mechanical systems in general and other aircraft systems in particular. Examples of the types of aircraft systems that the present invention can be applied to include environmental control systems, aircraft hydraulic systems, aircraft fuel delivery systems, lubrication systems, engine starter systems, aircraft landing systems, flight control systems and nuclear, biological, chemical (NBC) detection systems.

The present invention thus provides a system and method for trending performance in a mechanical system. The trending system includes a performance estimator and a predictive trending mechanism. The performance estimator receives sensor data from the mechanical system and generates performance parameter estimates for the mechanical system. The performance parameter estimates are parametric data that are indicative of performance in the mechanical system. The performance parameter estimates are passed to a predictive trending mechanism. The predictive trending mechanism determines an estimated trend for the performance parameter estimates through monotonic regression of the performance parameter estimates. The estimated trend of the performance parameter estimates can include filtered values of the performance parameter estimates and/or predictions of future performance parameters.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A trending system far trending performance in an mechanical system, the trending system comprising:
  a performance estimator, the performance estimator adapted to receive sensor data and generate performance parameter estimates for the mechanical system; and
  a predictive trending mechanism, the predictive trending mechanism adapted to receive the performance parameter estimates and determine an estimated trend for the performance parameters through monotonic regression of the performance parameter estimates, wherein the estimated trend determined by the predictive trending mechanism includes a filtered estimate of the performance parameter and a prediction of future performance parameters.

2. The system of claim 1 wherein the predictive trending mechanism comprises a quadratic programming problem solver.

3. The system of claim 1 wherein the predictive trending mechanism performs a first order monotonic regression analysis through imposing a linear constraint of a monotonic data change in a quadratic programming problem.

4. The system of claim 1 wherein the predictive trending mechanism performs a second order monotonic regression analysis, the second-order monotonic regression analysis determining an estimated trend for a primary fault condition and an estimated trend for secondary damage accumulating because of this primary fault condition.

5. The system of claim 4 wherein the predictive trending mechanism performs the second order monotonic regression analysis through imposing a linear constraint of a monotonic trend rate change reflecting the primary fault condition and a linear constraint of the monotonic data change reflecting the secondary fault condition in a quadratic programming problem.

6. The system of claim 1 wherein the predictive trending mechanism includes at least one tuning parameter selected to achieve a desired tradeoff in noise rejection and data following performance for the estimated trend.

7. The system of claim 1 wherein the performance estimator generates the performance parameter estimates for the mechanical system from sensor data residuals.

8. The system of claim 7 wherein the performance estimator generates the sensor data residuals by using a predictive model of the mechanical system.

9. A method of trending performance in a mechanical system, the method comprising the steps of:
   a) receiving sensor data from the mechanical system;
   b) generating performance parameter estimates for the mechanical system from the received sensor data; and
   c) determining an estimated trend for the performance parameter through monotonic regression of the performance parameter estimates, wherein the estimated trend includes a filtered estimate of the performance parameter and a prediction of future performance parameters.

10. The method of claim 9 wherein the step of determining an estimated trend for the performance parameter through monotonic regression of the performance parameter estimates comprises determining the estimated trend with a quadratic programming problem solver.

11. The method of claim 9 wherein the step of determining an estimated trend for the performance parameter through monotonic regression of the performance parameter estimates comprises a first order monotonic regression analysis through imposing a linear constraint of a monotonic data change in a quadratic programming problem.

12. The method of claim 9 wherein the step of determining an estimated trend for the performance parameter through monotonic regression of the performance parameter estimates comprises a second order monotonic regression analysis, the second-order monotonic regression analysis determining an estimated trend for a primary fault condition and an estimated trend for secondary damage accumulating because of this primary fault condition.

13. The method of claim 12 wherein the second order monotonic regression analysis is performed through imposing a linear constraint of a monotonic trend rate change reflecting the primary fault condition and a linear constraint of the monotonic data change reflecting the secondary fault condition in a quadratic programming problem.

14. The method of claim 9 wherein the step of determining an estimated trend for the performance parameter through monotonic regression of the performance parameter estimates comprises selecting at least one tuning parameter to achieve a desired tradeoff in noise rejection and trend following performance.

15. The method of claim 9 wherein the step of generating performance parameter estimates forte mechanical system from the received sensor data comprises generating residuals from the received sensor data.

16. The method of claim 15 wherein the step of generating residuals from the received sensor data comprises comparing the sensor data to expected sensor values by using a predictive model.

17. A program product embedded in a computer readable medium comprising:
   a) a trending program, the trending program including:
      a performance estimator, the performance estimator adapted to receive and generate performance parameter estimates for a mechanical system; and
      a predictive trending mechanism, the predictive trending mechanism adapted to receive the performance parameter estimates and determine an estimated trend for the performance parameters through monotonic regression of the performance parameter estimates, wherein the estimated trend determined by the predictive trending mechanism includes a filtered estimate of the performance parameter and a prediction of future performance parameters; and
   b) signal bearing media bearing said trending program.

18. The program product of claim 17 wherein the signal bearing media comprises recordable media.

19. The program product of claim 17 wherein the signal bearing media comprises transmission media.

20. The program product of claim 17 wherein the predictive trending mechanism comprises a quadratic programming problem solver.

21. The program product of claim 17 wherein the predictive trending mechanism performs a first order monotonic regression analysis through imposing a linear constraint of a monotonic data change in a quadratic programming problem.

22. The program product of claim 17 wherein the predictive trending mechanism performs a second order monotonic regression analysis, the second-order monotonic regression analysis determining an estimated trend for a primary fault condition and an estimated trend for secondary damage accumulating because of this primary fault condition.

23. The program product of claim 22 wherein the predictive trending mechanism performs the second order monotonic regression analysis through imposing a linear constraint of a monotonic trend rate change reflecting the primary fault condition and a linear constraint of the monotonic data change reflecting the secondary fault condition in a quadratic programming problem.

24. The program product of claim 17 wherein the predictive trending mechanism includes at least one tuning parameter selected to achieve a desired tradeoff in noise rejection and data following performance for the estimated trend.

25. The program product of claim 17 wherein the performance estimator generates the performance parameter estimates for the mechanical system from sensor data residuals.

26. The program product of claim 25 wherein the performance estimator generates the sensor data residuals by using a predictive model of the mechanical system.

27. An apparatus comprising:
a) a processor;
b) a memory coupled to the processor;
c) a trending program residing in the memory and being executed by the processor, the trending program including:
   i) a performance estimator, the performance estimator adapted to receive sensor data and generate performance parameter estimates for the mechanical system; and
   ii) a predictive trending mechanism, the predictive trending mechanism adapted to receive the performance parameter estimates and determine an estimated trend for the performance parameters through monotonic regression of the performance parameter estimates, wherein the estimated trend determined by the predictive trending mechanism includes a filtered estimate of the performance parameter and a prediction of future performance parameters.

28. The apparatus of claim 27 wherein the predictive trending mechanism comprises a quadratic programming problem solver.

29. The apparatus of claim 27 wherein the predictive trending mechanism performs a first order monotonic regression analysis through imposing a linear constraint of a monotonic data change in a quadratic programming problem.

30. The apparatus of claim 27 wherein the predictive trending mechanism performs a second order monotonic regression analysis, the second-order monotonic regression analysis determining an estimated trend for a primary fault condition and an estimated trend for secondary damage accumulating because of this primary fault condition.

31. The apparatus of claim 30 wherein the predictive trending mechanism performs the second order monotonic regression analysis through imposing a linear constraint of a monotonic trend rate change reflecting the primary fault condition and a linear constraint of the monotonic data change reflecting the secondary fault condition in a quadratic programming problem.

32. The apparatus of claim 27 wherein the predictive trending mechanism includes at least one tuning parameter selected to achieve a desired tradeoff in noise rejection and data following performance for the estimated trend.

33. The apparatus of claim 27 wherein the performance estimator generates the performance parameter estimates for the mechanical system from sensor data residuals.

34. The apparatus of claim 33 wherein the performance estimator generates the sensor data residuals by using a predictive model of the mechanical system.

* * * * *

UNITED STATES PATENT AND TRADEMARK OFFICE
CERTIFICATE OF CORRECTION

PATENT NO. : 7,072,797 B2 Page 1 of 1
APPLICATION NO. : 10/651550
DATED : July 4, 2006
INVENTOR(S) : Dimitry Gorinevsky It is certified that error appears in the above-identified patent and that said Letters Patent is hereby corrected as shown below:

Column 14, line 57, "far" should be changed to --for--;
Column 16, line 11, "forte" should be changed to --for the--.

Signed and Sealed this

Tenth Day of April, 2007

JON W. DUDAS
*Director of the United States Patent and Trademark Office*